(12) United States Patent
Suzuki et al.

(10) Patent No.: US 7,535,671 B2
(45) Date of Patent: May 19, 2009

(54) DISK DRIVE WITH AIRFLOW CONTROL AND FINS AT A TRANSITION SURFACE BETWEEN BASE SURFACES

(75) Inventors: Takao Suzuki, Kanagawa (JP); Takeshi Chawanya, Kanagawa (JP); Kohichi Takeuchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 405 days.

(21) Appl. No.: 11/317,950

(22) Filed: Dec. 22, 2005

(65) Prior Publication Data
US 2006/0139798 A1    Jun. 29, 2006

(30) Foreign Application Priority Data
Dec. 24, 2004    (JP) ............................. 2004-373078

(51) Int. Cl.
*G11B 33/08*    (2006.01)
(52) U.S. Cl. ............................................ 360/97.02
(58) Field of Classification Search ............... 360/97.02, 360/97.03, 97.04, 97.01
See application file for complete search history.

(56) References Cited
U.S. PATENT DOCUMENTS

| 5,453,890 | A  | * | 9/1995  | Takegami et al. | ........ | 360/97.02 |
|-----------|----|---|---------|-----------------|----------|-----------|
| 5,541,791 | A  | * | 7/1996  | Yamasaki et al. | ........ | 360/256.1 |
| 5,598,306 | A  | * | 1/1997  | Frees et al.    | ........ | 360/97.02 |
| 7,031,104 | B1 | * | 4/2006  | Butt et al.     | ........ | 360/97.02 |
| 7,133,248 | B2 | * | 11/2006 | Shin et al.     | ........ | 360/97.01 |
| 7,149,053 | B2 | * | 12/2006 | Tadepalli et al.| ........ | 360/97.02 |
| 2002/0075591 | A1 | * | 6/2002 | Chang et al.   | ........ | 360/97.02 |
| 2003/0117746 | A1 | * | 6/2003 | Kovinskaya et al. | ..... | 360/97.02 |
| 2003/0151848 | A1 | * | 8/2003 | Lee            | ........ | 360/97.02 |
| 2004/0095679 | A1 | * | 5/2004 | Shin et al.    | ........ | 360/234.3 |
| 2004/0120071 | A1 |   | 6/2004 | Akama et al.   |          |           |

FOREIGN PATENT DOCUMENTS

| JP | 04-106781    | 4/1992 |
|----|--------------|--------|
| JP | 2004-171674  | 6/2004 |

\* cited by examiner

*Primary Examiner*—Jefferson Evans
(74) *Attorney, Agent, or Firm*—Townsend and Townsend and Crew LLP; John Henkhaus

(57) ABSTRACT

Embodiments of the invention suppress the occurrence of turbulence in a disk drive. In one embodiment, an HDD includes a spindle motor for rotating a magnetic disk, and a base for housing the spindle motor therein. The base includes a first bottom surface opposed to the magnetic disk, and a second bottom surface that is opposed to the magnetic disk and that is larger in distance to the magnetic disk than the first surface. A step is formed between the first bottom surface and the second bottom surface, where rotation of the magnetic disk produces an airflow running from the first surface toward the second surface. The step is provided with upright fins extending from the first surface toward the second surface which are stood upright.

16 Claims, 7 Drawing Sheets

DISK DRIVE WITH AIRFLOW CONTROL AND FINS AT A TRANSITION SURFACE BETWEEN BASE SURFACES

CROSS-REFERENCES TO RELATED APPLICATIONS

This application claims priority from Japanese Patent Application No. JP2004-373078, filed Dec. 24, 2004, the entire disclosure of which is incorporated herein by reference.

BACKGROUND OF THE INVENTION

The present invention relates to a disk drive, and more particularly, to control of an airflow generated by rotation of a recording disk in a disk drive.

Data storage devices using various types of media such as optical disks and magnetic tapes are known in the art. Among them, hard disk drives (hereinafter referred to as HDDs) have become popular as storage devices for computers to such an extent that they are one type of the storage devices indispensable for today's computers. Further, not limited to computer systems, HDDs are expanding more and more in application because of their excellent characteristics. For example, HDDs are used for moving picture recording/reproducing devices, car navigation systems, cellular phones, and removable memories for use in digital cameras.

Each magnetic disk used in an HDD has a plurality of tracks formed concentrically and each track is divided into a plurality of sectors. Servo data and user data are stored in each of the sectors. A spindle motor rotates the magnetic disk and a head element as a thin film element makes access to a desired address position in accordance with the servo data stored in a sector, whereby it is possible to effect write or read of data to or from the magnetic disk.

Head element portions are fixed to a slider and constitute a head. The slider flies above a rotating magnetic disk to thereby enable positioning of the head or head element portions to a desired position on the magnetic disk. In data read processing, a signal read from the magnetic disk by a head element portion is subjected to predetermined signal processing such as waveform shaping or decoding processing by a signal processing circuit and is transmitted to a host. The data transferred from the host is subjected to predetermined processing by the signal processing circuit, after which it is written in the magnetic disk.

The HDD has a problem with an airflow generated by rotation of the magnetic disk. For example, the airflow causes an actuator to flutter, which obstructs accurate positioning of a head. In order to suppress the vibration of the head caused by turbulence of an airflow, for example, Patent Reference 1 (Japanese Patent Laid-open No. 2004-171674) discloses a magnetic disk device in which a straightening plate is provided on a ramp in order to suppress the vibration of the head caused by turbulence of an airflow.

The HDD has another problem of vibration of a magnetic disk (disk flutter) caused by the turbulence of an airflow generated by rotation of the magnetic disk. The disk flutter obstructs accurate positioning of the head to the track, similar to the vibration of the head itself. In particular, an increase in recording density of the magnetic disk raises TPI (Track Per Inch), which requires more accurate positioning of the head. Thus, slight disk flutter poses a great problem.

BRIEF SUMMARY OF THE INVENTION

One approach to reduce the flutter of the magnetic disk is to make a gap between the bottom surface of the base and the magnetic disk small to suppress a flow of gas between the magnetic disk and the base bottom surface. However, as the base bottom surface is made closer to the magnetic disk to increase air resistance is increased, thereby increasing the current of the spindle motor.

The present invention has been accomplished on the basis of the circumstances as described above, and a feature of the invention is to suppress the flutter of a magnetic disk to reduce the amount of motor current.

Here, a base bottom surface is formed with some steps. For example, since it is necessary to ensure the turning space of an actuator, part of the base bottom surface cannot be made closer to the magnetic disk. Therefore, a step is produced between a base bottom surface near the recording surface of the magnetic disk and another base bottom surface away from the recording surface of the magnetic disk. The inventors have studied earnestly, and then found that the shape of the step between the base bottom surfaces greatly contributes to the turbulence of an airflow caused by rotation of the magnetic disk, or to the current amount of the spindle motor.

A disk drive according to a first aspect of the present invention comprises: a motor for rotating a recording disk; a base adapted to house the motor therein, and having a first bottom surface opposite to the recording disk and a second bottom surface opposite to the recording disk, a distance between the second bottom surface and the recording disk being greater than that between the first bottom surface and the recording disk; and an upright fin extending from the first bottom surface to the second bottom surface, at a step between the first bottom surface and the second bottom surface, where rotation of the recording disk produces an airflow running from the first bottom surface toward the second bottom surface. With provision of the fin, it is possible to suppress the turbulence of an airflow.

In some embodiments, the step is formed by a slope extending from the first bottom surface toward the second bottom surface.

In some embodiments, the step is formed with a plurality of fins. Further, preferably, the plurality of fins are spaced apart from each other at substantially equal intervals in the radial direction of the recording disk. Thus, it is possible to suppress the turbulence of an airflow more effectively.

Preferably, the plurality of fins each have a circular arc sidewall which is convex toward the outer circumference of the recording disk.

Preferably, an inclined angle of the step is substantially 5° to 15°. Thus, it is possible to suppress the turbulence of an airflow more effectively.

The disk drive further includes an actuator which is turned to thereby move a head above the recording disk, wherein the second bottom surface is formed at a level lower than the first bottom surface so as to form a turning range of the actuator. In the disk drive with such a configuration, the present invention is particularly effective.

A disk drive according to another aspect of the present invention comprises: a motor for rotating a recording disk; a base for housing the motor, and having a first bottom surface opposite to the recording disk and a second bottom surface, a distance between the second bottom surface and the recording disk being greater than that between the first bottom surface and the recording disk; a first step located between the first bottom surface and the second bottom surface, where rotation of the recording disk produces an airflow running from the first bottom surface toward the second bottom surface; and a second step located between the first bottom surface and the second bottom surface, where the rotation of the recording disk produces an airflow running from the second bottom surface toward the first bottom surface, the second step having an inclined angle larger than that of the first step. Since the inclined angle of the second step is larger than that of the first step, it is possible to suppress the turbulence of an airflow to reduce the amount of current of the motor.

In specific embodiments, an inclined angle of the step is substantially 5° to 15° in order to suppress the turbulence of an airflow more effectively. Further, an inclined angle of the second step is substantially 45° or more in terms of reduction in the current amount of the motor. Furthermore, the first step is provided with a plurality of fins stood upright from the base bottom and extending from the first surface toward the second surface; and the plurality of fins each have an inner circumferential surface and an outer circumferential surface that are curved in the inner circumferential direction of the recording disk, and are spaced apart from each other at substantially equal intervals in the radial direction of the recording disk. With the provision of fins, it is possible to suppress the turbulence of an airflow.

Preferably, the first step is provided a fin stood upright from the base bottom and extending from the first surface toward the second surface. With the provision of fins, it is possible to suppress the turbulence of an airflow.

According to the present invention, it is possible to suppress flutter of a recording disk to reduce the amount of current of the motor.

DETAILED DESCRIPTION OF THE INVENTION

Figure 1:
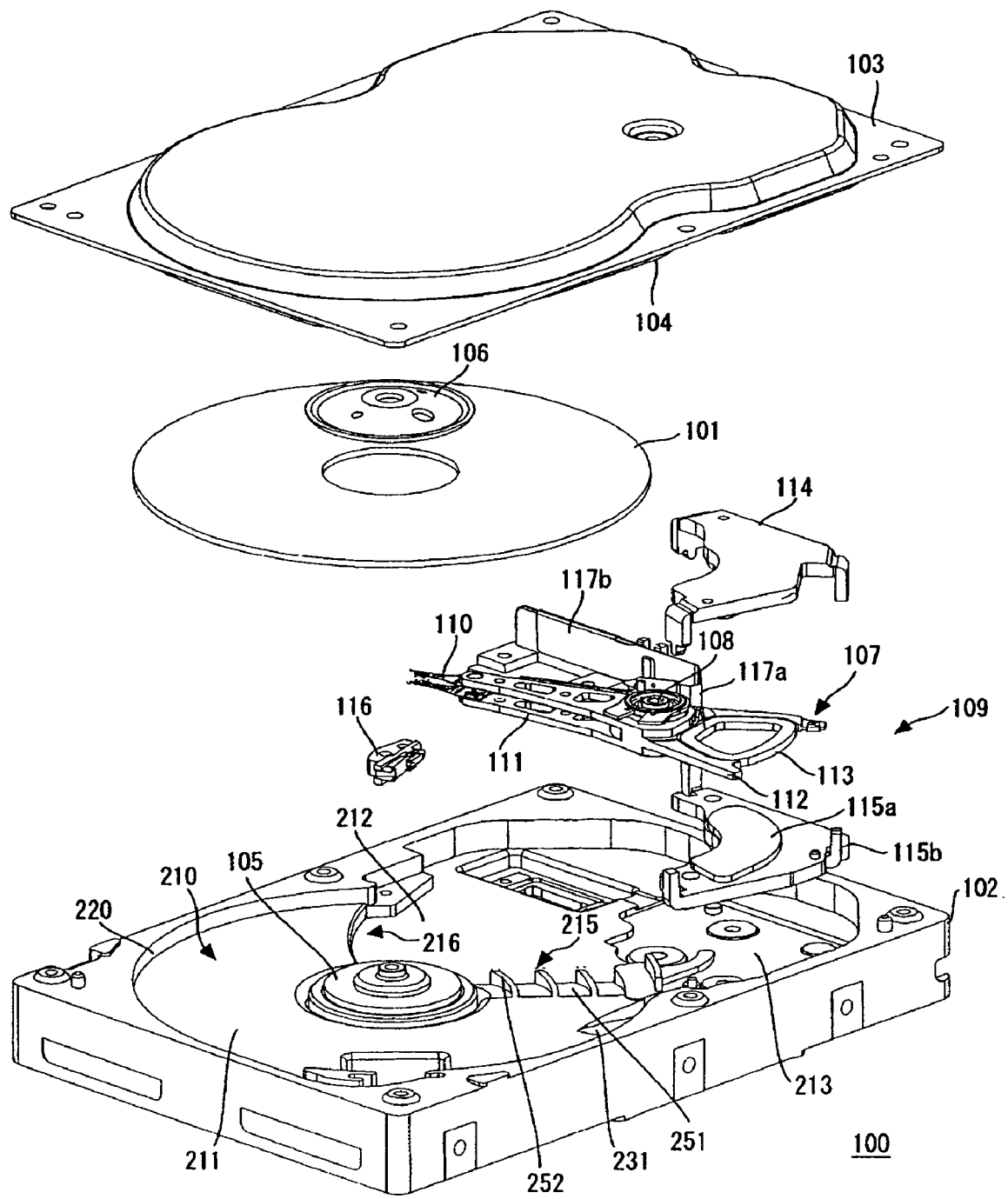
FIG. 1 is an exploded perspective view schematically showing the whole structure of a HDD according to an embodiment of the present invention.

The specific embodiments to which the present invention is applied will be hereinafter described. For clarification of explanation, the following description and drawings are suitably omitted and simplified. Further, in the drawings, the same elements are indicated by the same reference numerals, and to clarify explanation, duplicate explanation or the reference numerals of the drawings are omitted.

Specific embodiments to which the present invention is applied will be described in detail with reference to the drawings. The disk drive in the present embodiment is characterized by the structure of the base thereof. For better understanding of the present invention, first, the whole structure of a hard disk drive (hereinafter referred to as HDD) as one example of the disk drive will be described. FIG. 1 is an exploded perspective view schematically showing the structure of a HDD 100 according to the present embodiment. In FIG. 1, numeral 101 denotes a recording medium for storing data, which is a magnetic disk, a non-volatile recording disk, for storing data by magnetizing a magnetic layer. Numeral 102 denotes a base for housing structural elements of the HDD 100. The base 102 is fixed to a top cover 103 closing an upper opening of the base 102 through a gasket 104 to constitute a disk enclosure, which is able to house the structural elements of the HDD 100 in a closed state. Incidentally, the structure of the base 102 will be mentioned later in detail.

The magnetic disk 101 is placed on a hub of a spindle motor 105, held between a screwed top clamp 106 and a hub, and thereby fixed to the spindle motor 105. The spindle motor 105 is fixed to the bottom surface of the base 102 to rotate the magnetic disk 101 at a predetermined speed.

An actuator 107 is held by a turning shaft 108 for turning, and driven by a VCM (Voice Coil Motor) 109. The actuator 107 holds a head (not shown) at an extreme end thereof, and turns to position the head to a desired position on the magnetic disk 101. The head comprises a slider, and a head element as a conversion element fixed to the surface of the slider. The head element writes and/or reads to and/or from the magnetic disk 101 data input and output between the head element and a host (not shown). The head element portion has a recording element for converting an electrical signal into a magnetic field according to data stored in the magnetic disk 101 and/or a reproducing element for converting the magnetic field from the magnetic disk 101 into an electrical signal.

The actuator 107 includes structural members, that is, a suspension 110, an arm 111, a coil support 112, and a flat coil 113, which are connected to one another in that order from the extreme end where the head is disposed. Numeral 114 denotes an upper stator magnet holding plate, numeral 115a denotes a lower stator magnet, and numeral 115b denotes a lower stator magnet holding plate. These are arranged so as to put the flat coil 113 between an upper stator magnet (not shown) fixed to the upper stator magnet holding plate 114 and the lower stator magnet 115b. The VCM 109 is composed of the flat coil 113, the upper stator magnet and the lower stator magnet 115a.

Numeral 116 denotes a ramp adapted to rest the head unloaded from the magnetic disk 101 when rotation of the magnetic disk 101 stops. The present embodiment illustrates the load/unload system HDD with the ramp 116, but the present invention can be also applied to a CSS (Contact Start and Stop) system in which when data write/read processing is not carried out, the head is unloaded to a zone arranged in the inner periphery of the magnetic disk 101.

Further, the present embodiment illustrates the HDD provided with a single magnetic disk, but the present invention can be applied to a HDD provided with a plurality of stacked magnetic disks. If a plurality of magnetic disks are provided, the spindle motor integrally holds the plurality of magnetic disks spaced from one another at fixed intervals in the direction of a rotary axis thereof. Further, typically, data are stored in both surfaces of the magnetic disk as shown in the present embodiment, but the structure for recording data on only one surface of the magnetic disk is enabled.

For read/write of data from the magnetic disk 101, the actuator 107 moves the head above the data region of the surface of the rotating magnetic disk 101. The actuator 107 turns about the rotary shaft 108 whereby the head moves in the radial direction of the surface of the magnetic disk 101. Thus, the head (head element portion) is able to get access to a desired track. Pressure caused by viscosity of air between an ABS (Air Bearing Surface) opposite to the magnetic disk 101 and the rotating magnetic disk becomes balanced with pressure applied in the direction of the magnetic disk 101 by the suspension 110 whereby the head flies at a fixed gap above the magnetic disk 101.

When rotation of the magnetic disk 101 stops, the actuator 107 withdraws the head from the data region to the ramp 116. The actuator 107 turns in the direction of the ramp 116, and the tab at the extreme end of the actuator slidably moves on the slope of the ramp 116 to ride on the parking surface of the ramp 116, whereby the head is unloaded. At the time of loading, the actuator 107 supported on the parking surface is disengaged from the ramp 116, and moves above the surface of the magnetic disk 101.

A circuit board (not shown) is mounted on the outer surface (lower surface) of the base 102. The circuit board is typically a rectangle of the size that covers the outer half surface of the base 102. Electric power and signals for driving the motor are input and output between the circuit board and the spindle motor 105. Power to a coil for the VCM 109, electric power and signals for read of the head is input and output between the circuit board and the actuator 107. Input/output between the circuit board and the head is carried out through a FPC 117a fixed to a FPC (Flexible Printed Circuit) support 117b.

The base 102 in the present embodiment will be described in detail hereinafter. As shown in FIG. 1, the base 102 is provided with a bottom portion 210 to which the structural parts of the HDD 100 are fixed, and a wall portion 220 formed so as to surround the outer periphery of the bottom portion 210. The bottom portion 210 is provided with a plurality of areas (bottom surfaces). One of them is a first bottom surface 211 opposed to the magnetic disk 101 and located at a level higher than other bottom surfaces. Another one is a second bottom surface 212 that is formed adjacent to the first bottom surface and on the side of the actuator 107 in the first bottom surface. The second bottom surface 212 is lower than the first bottom surface 211 and corresponds to the turning range of the actuator 107. Furthermore, the bottom portion 210 is provided with a third bottom surface 213 which is lower than the second bottom surface 212 and to which the structural parts of the VCM 109 are fixed.

Figure 2:
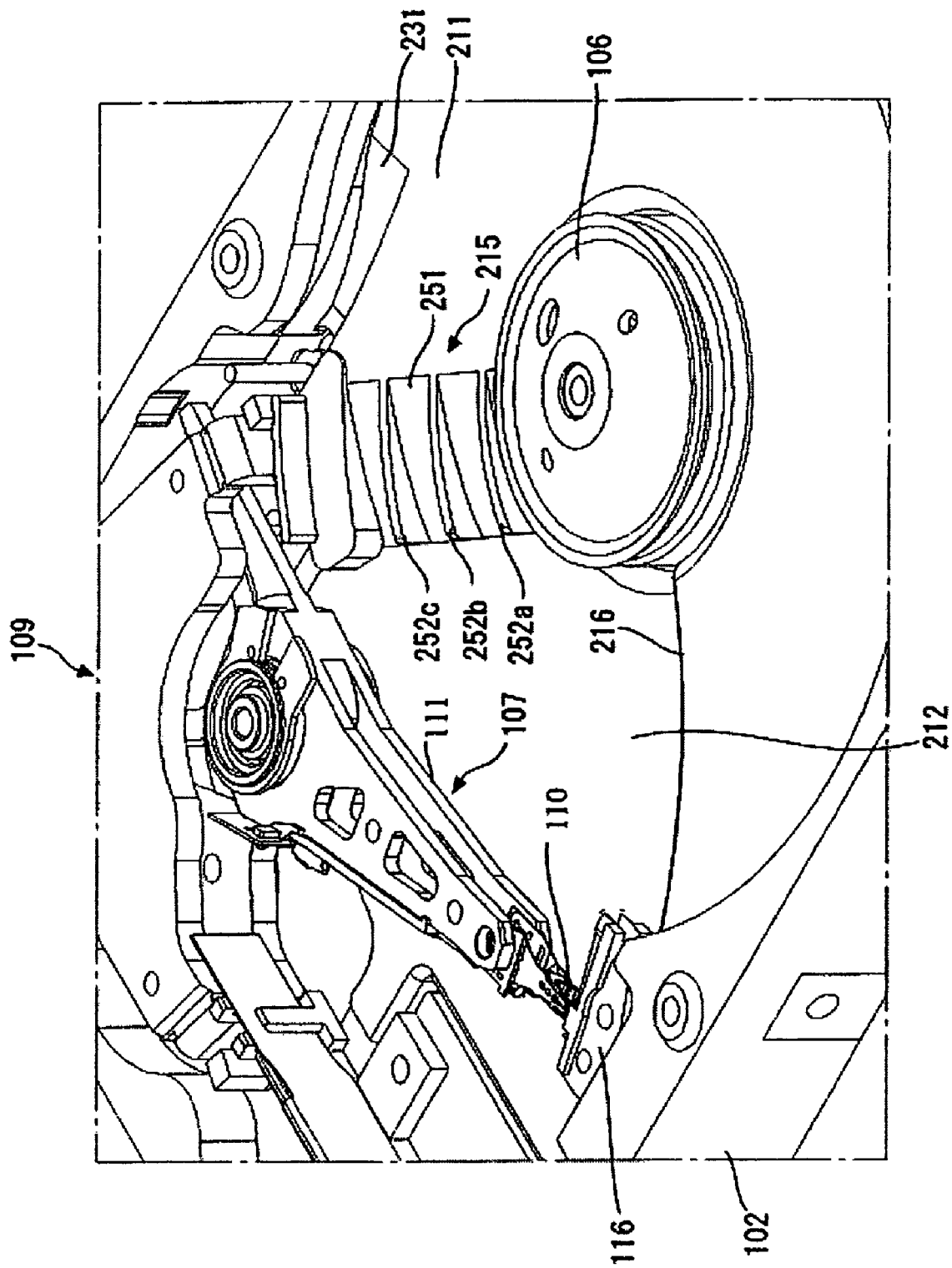
FIG. 2 is a perspective view showing the shape of a first step in a base according to the present embodiment.

FIG. 2 is a perspective view showing a partial structure of the HDD 100 in the present embodiment. In FIG. 2, the magnetic disk 101 is omitted. The first bottom surface 211 opposed to the magnetic disk 101 is formed at a level higher than the second bottom surface 212, and is small in distance from the recording surface of the magnetic disk 101. The first bottom surface 211 occupies a major surface facing the magnetic disk 101 in the bottom portion 210. A gap between the first bottom surface 211 and the magnetic disk 101 is made small to thereby suppress an airflow between the magnetic disk 101 and the first bottom surface 211, thereby reducing the flutter of the magnetic disk 101.

To suppress the flutter of the magnetic disk 101, preferably, the whole bottom surface opposed to the magnetic disk 101 is made closer to the magnetic disk 101. However, it is necessary to define a space adapted to turn the actuator 107 between the bottom portion 210 and the recording surface of the magnetic disk 101. As mentioned above, the second bottom surface 212 corresponds to the turning range of the actuator 107, a part thereof is opposed to the magnetic disk 101, and the other part thereof is opposed to the actuator 107 in an unloaded state. The second bottom surface 212 is formed at a level lower than the first bottom surface 211 whereby the space adapted to turn the actuator 107 can be secured between the magnetic disk 101 and the second bottom surface 212.

As described above, the distance between the surface of the second bottom surface 212, opposed to the magnetic disk 101 and the recording surface of the magnetic disk 101 is larger than that between the surface of the first bottom surface 211, opposed to the magnetic disk 101 and the recording surface of the magnetic disk 101. Thus, two steps 215, 216 or differences in level are present between the first bottom surface 211 and the second bottom surface 212. The first step 215 is present on the rear end side of the actuator 107, that is, on the side of the VCM 109. The second step 216 is present on the extreme end side of the actuator 107, that is, on the side of the head or ramp 116.

The first step 215 is formed with a slope 251 extending from the first bottom surface 211 toward the second bottom surface 212. Further, the step 215 is formed with a plurality of fins extending from the first bottom surface 211 toward the second bottom surface 212. In an example of FIG. 2, the first step 215 is formed with three fins 252a, 252b, and 252c illustratively.

Figure 3:
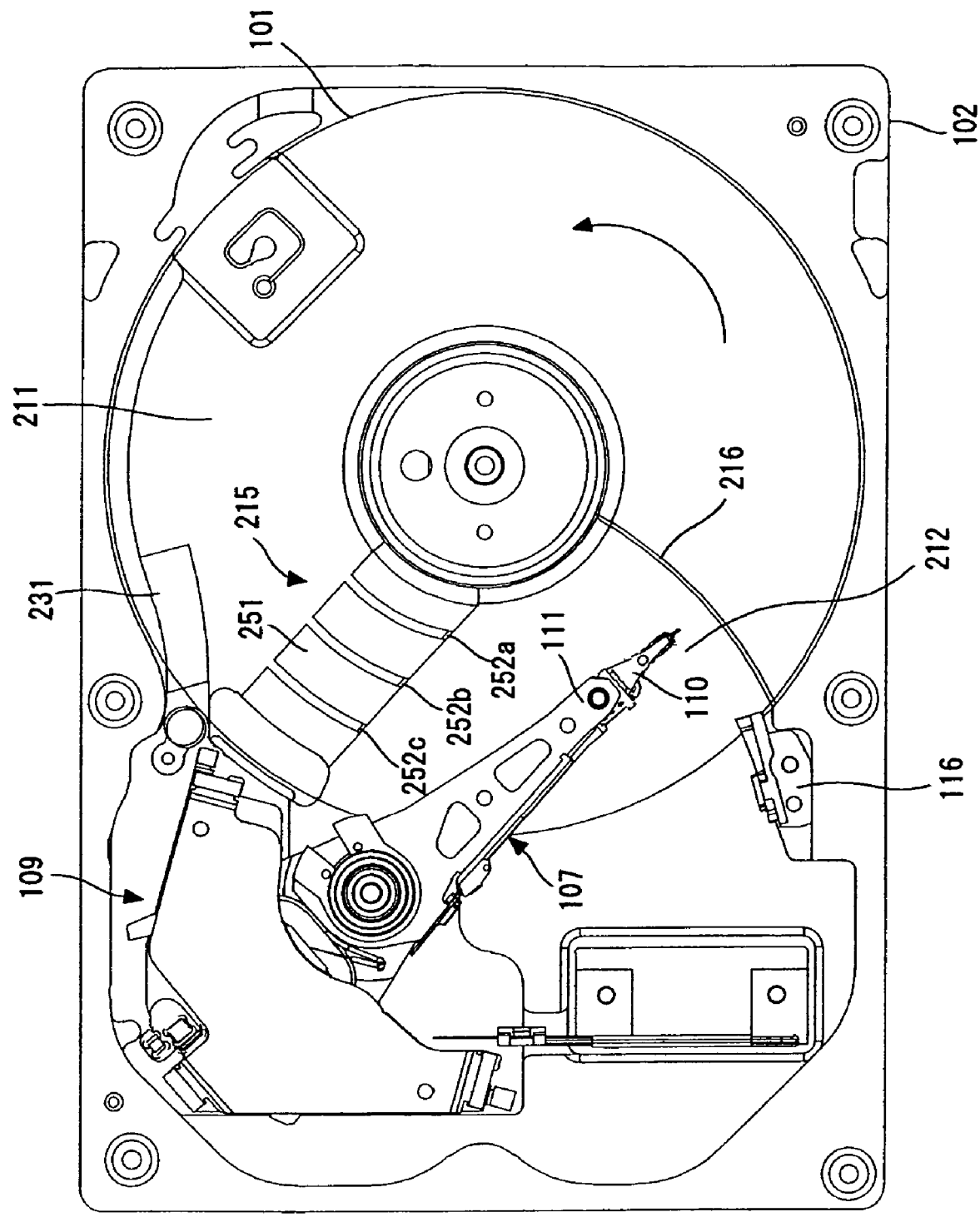
FIG. 3 is a top plan view schematically showing the whole structure of the HDD according to the present embodiment.

FIG. 3 is a top plan view showing the internal structure of the HDD 100 according to the present embodiment. In FIG. 3, only the outline of the magnetic disk 101 is shown, and the base bottom portion 210 to which the magnetic disk 101 is opposed is shown. As shown in FIG. 3, the magnetic disk 101 rotates toward the suspension 110 from the VCM 107. In other words, the magnetic disk 101 rotates counterclockwise as viewed from the top cover 103 (the side opposite to the base 102).

Rotation of the magnetic disk 101 produces an airflow between the magnetic disk 101 and the base bottom portion 210. The airflow runs in the rotational direction of the magnetic disk 101. Thus, in the first step 215, the airflow runs from the first bottom surface 211 toward the second bottom surface 212 according to the rotation of the magnetic disk 101. On the other hand, in the second step 216, the airflow runs from the second bottom surface 212 toward the first bottom surface 211 according to the rotation of the magnetic disk 101.

Returning to FIG. 2, the step 215 is formed with the slope 251 as mentioned above. This suppresses the turbulence of the airflow running from the first bottom surface 211 toward the second bottom surface 212, and leads to reduction in flutter of the magnetic disk 101, or reduction in the current amount of the spindle motor 105. The slope 251 is formed such that its height becomes progressively smaller from the first bottom surface 211 toward the second bottom surface 212. Accordingly, the distance between the slope 251 and the magnetic disk 101 become progressively larger as the second bottom surface 212 is approached. As described above, the space between the base bottom 210 and the magnetic disk 101 is gradually widened from the narrow space between the first bottom surface 211 and the magnetic disk 101 to the wide space between the second bottom surface 212 and the magnetic disk 101. This makes it possible to effectively suppress the turbulence of airflow (generation of turbulent flow) at the first step 215.

Figure 4:
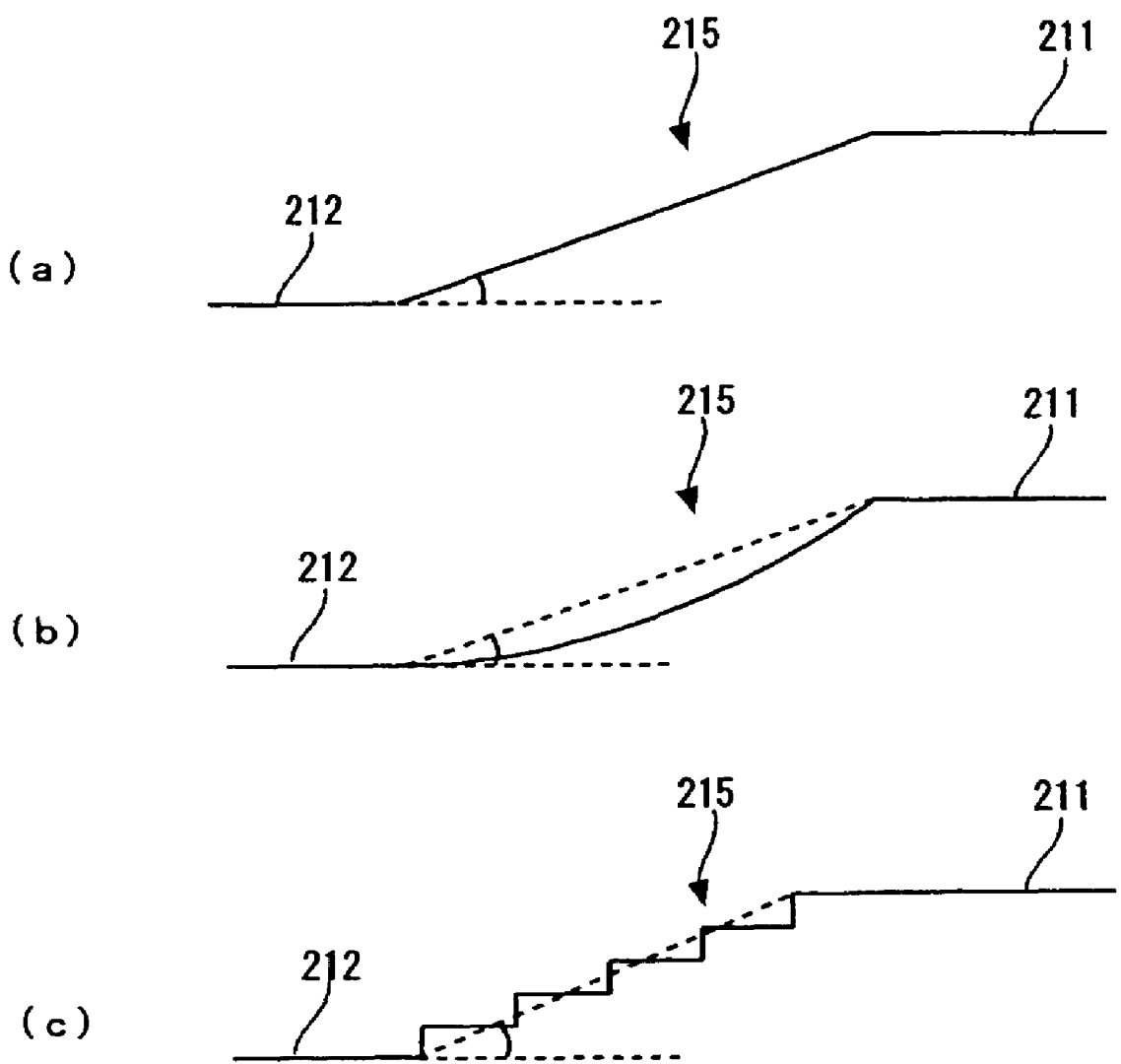
FIG. 4a-c are views showing an example of the sectional shape of the first step in a base according to the present embodiment.

Here, it is preferred that to suppress the turbulence of airflow, a slope in which the distance relative to the magnetic disk 101 changes continuously is formed, but the first step 215 may be formed with a slope having another shape. For example, it is possible to form a plurality of sub-steps in the first step 215. Further, the slope may be formed to be a convex or concave circular arc relative to the magnetic disk 101. FIG. 4 shows an example of a sectional shape of the first step 215. FIG. 4(a) shows the linear slope shown in FIG. 2, FIG. 4(b) shows a slope with a concave circular arc relative to the magnetic disk 101, and FIG. 4(c) shows a multi-step slope.

To effectively suppress an airflow running from the first step 215 toward the second step 216, an inclined angle of the slope of the first step 215 is preferably substantially 5° to 15°, more preferably, about 7° to 13°. Here, the inclined angle is an angle defined between a line joining an end of the first bottom surface 211 and the end of the second bottom surface 212 of the first step 215 and the second bottom surface 212 as shown in FIG. 4.

Further, a plurality of fins 252 are present in the first step 215. In the present example, each fin 252 is provided on the slope 251, and stand upright substantially vertical to the first and second bottom surfaces 211, 212. The upper surface of each fin 252 (surface opposed to the magnetic disk 101) is substantially flush with the first bottom surface 211. The distance between the upper surface of each fin 252 and the magnetic disk 101 is substantially the same as that between the first bottom surface 211 and the upper surface of each fin 252. The side face of each fin 252 on the side of the second bottom surface 212 is substantially vertical to the second bottom surface 212. In the present embodiment, the fin 252 is formed integral with the base 101, that is, the fin 252 and the base 101 are the same member. Therefore, the fin 252 can be formed merely by processing the base 102 without increasing the number of components. It is to be noted that the fin 252 may be formed with a slope on the upper surface thereof or on the side face thereof on the side of the bottom surface 212.

Figure 5:
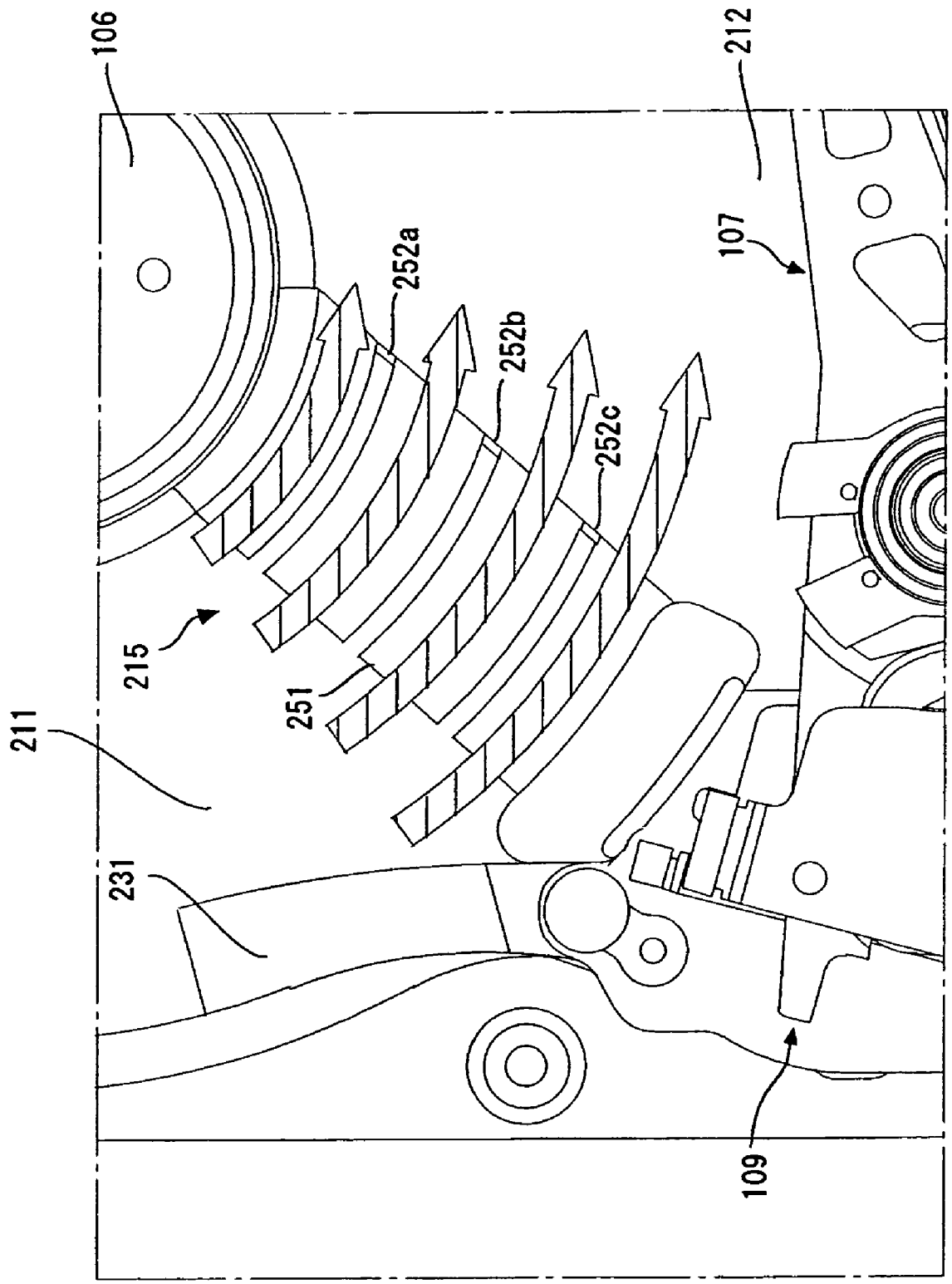
FIG. 5 is a view schematically showing the effect of fins in a base according to the present embodiment.

Referring to FIG. 3, a plurality of fins 252 are spaced apart from each other in the radial direction of the magnetic disk 101. The fins 252 are spaced apart from each other at equal intervals. Alternatively, the fins 252 are spaced apart from each other at unequal intervals. Where the fins 252 are spaced apart from each other at unequal intervals, they can be spaced at intervals that become progressively larger from the inner peripheral side toward the outer peripheral side of the magnetic disk 101. Alternatively, they can be spaced at intervals that become progressively smaller from the inner peripheral side toward the outer peripheral side. The spacing between each fin 252 is set to a preferable value in terms of reduction in disk flutter or motor current. To suppress the turbulence of airflow produced by the rotating magnetic disk 101, preferably, each fin 252 is provided with a circular arc-like sidewall that is convex toward the outside of the magnetic disk 101. Further, preferably, the sidewall substantially coincides with, and is curved along, the circumference of the magnetic disk 101. The circular-arc-like sidewall can be formed merely on the inner peripheral side or outer peripheral side of each fin 252, but as shown in FIG. 5, preferably, the sidewalls on both sides of each fin 252 are circular arc-like as mentioned above.

In the first step 215, the plurality of fins 252 control the airflow in the radial direction of the magnetic disk 101 so as to run along the circumferential direction thereof. As shown in FIG. 5, the airflow runs along the plurality of fins 252, and the fins 252 suppress the turbulence of the airflow running in the radial direction of the magnetic disk 101 in the first step 215. Thus, it is possible to reduce the amount of current used by the spindle motor 105 for rotating the magnetic disk 101.

Figure 6:
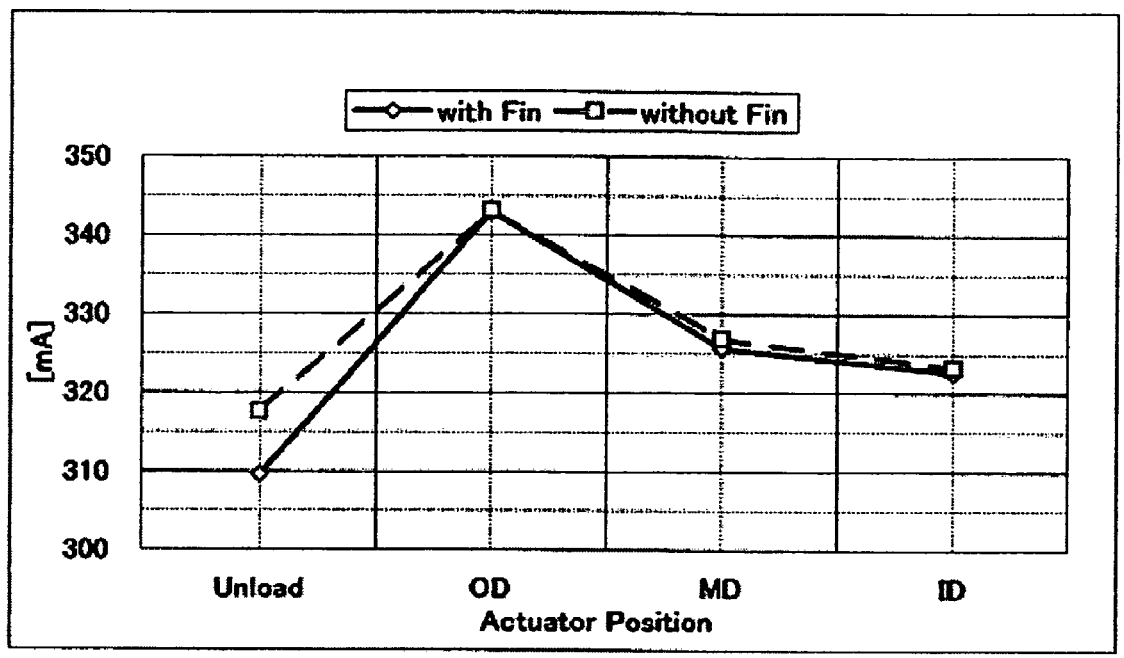
FIG. 6 is a graph showing the actual measurement values of current amounts of spindle motors of a HDD provided with fins and a HDD not provided with fins for showing the effect of fins according to the present embodiment.

The effect of the fins 252 in the present embodiment was measured. Current amounts of the spindle motor were measured for a HDD in which the base having a fin is mounted on the first step portion, and a HDD in which the base not provided with a fin is mounted on the first difference in level portion. FIG. 6 shows the measurements. In the graph of FIG. 6, the X-axis indicates a position of an actuator, and the Y-axis indicates the current amount of a spindle motor. In the X-axis, "unload" means a state where the actuator 107 is withdrawn to the ramp 116, "OD" an outer peripheral side, "MD" a center, and "ID" an inner peripheral side. The structures of the two HDDs were the same except for the presence or absence of the fins. As shown in the graph of FIG. 6, in the state where the actuator is unloaded, a great reduction in the current amount of the spindle motor of the HDD with the fins is found.

In the above-mentioned base 102, the first step 215 is provided with the slope 251 and the fins 252, but only one of them may be also employed in alternative embodiments. For example, in the first step 215, the first bottom surface 211 and the second bottom surface 212 are joined together through the sidewall vertical thereto, and the sidewall is formed with a fin extending therefrom toward the second bottom surface 212. Further, it is preferable that a plurality of fins be formed in terms of suppressing a turbulent flow, but even a single fin can exhibit the straightening effect.

Referring to FIGS. 2 and 3, a flow passage is formed which extends from the first bottom surface 211 toward the third bottom surface 213 having the VCM 109 thereon. The flow passage is formed with a slope 231 (FIG. 5). The slope 231 is formed so that the height thereof becomes progressively smaller from the first bottom surface 211 toward the third bottom surface 213. That is, the distance between the magnetic disk 101 and the slope increases progressively. As described, a section (space) expands progressively from the narrow space between the first bottom surface 211 and the magnetic disk 101 toward a wide space defined between the third bottom surface 213 having the VCM 109 thereon and the magnetic disk. Thus, the turbulence of an airflow under the magnetic disk 101 can be suppressed effectively. It is to be noted that the slope 231 can be replaced with an inclined surface of another shape similar to the first step 215.

Figure 7:
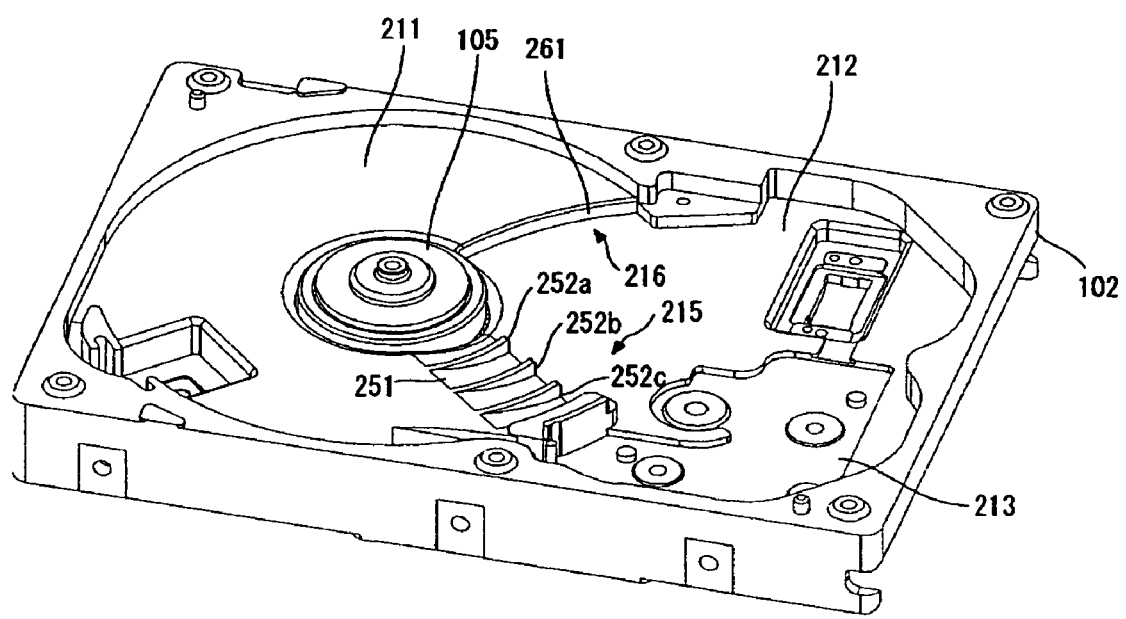
FIG. 7 is a perspective view showing the shape of a second step in a base according to the present embodiment.

Now, the second step 216 will be described hereinafter. In the HDD 100 of the present embodiment, the steps 215, 216 are formed such that an inclined angle of the second step 216 is larger than that of the first step 215. In the present embodiment, as shown in FIG. 7, the second step 216 is not formed with a slope, but a wall 261 is formed substantially vertical to the second bottom surface 212.

Preferably, the first difference in level portion 215 is formed at a predetermined inclined angle in terms of turbulent suppression. Preferably, in the second step 216, however, an inclined angle is made larger in terms of reduction in current amount of the spindle motor. The inclined angles of the two steps 215, 216 are made to differ from each other, and the slopes are formed unsymmetrical, whereby reduction in turbulence of airflow and consumption power can be achieved. An inclined angle of the second step 216 from the second bottom surface 212 toward he first bottom surface 211 is preferably substantially not less than 45°, preferably not more than 90°. The slope shape of the second step 216 can be formed, for example, as in the aforementioned first step portion 215. However, preferably, the second step 216 is formed with the substantially vertical wall 261 (an inclined angle 90°), as shown in FIG. 7.

Figure 8:
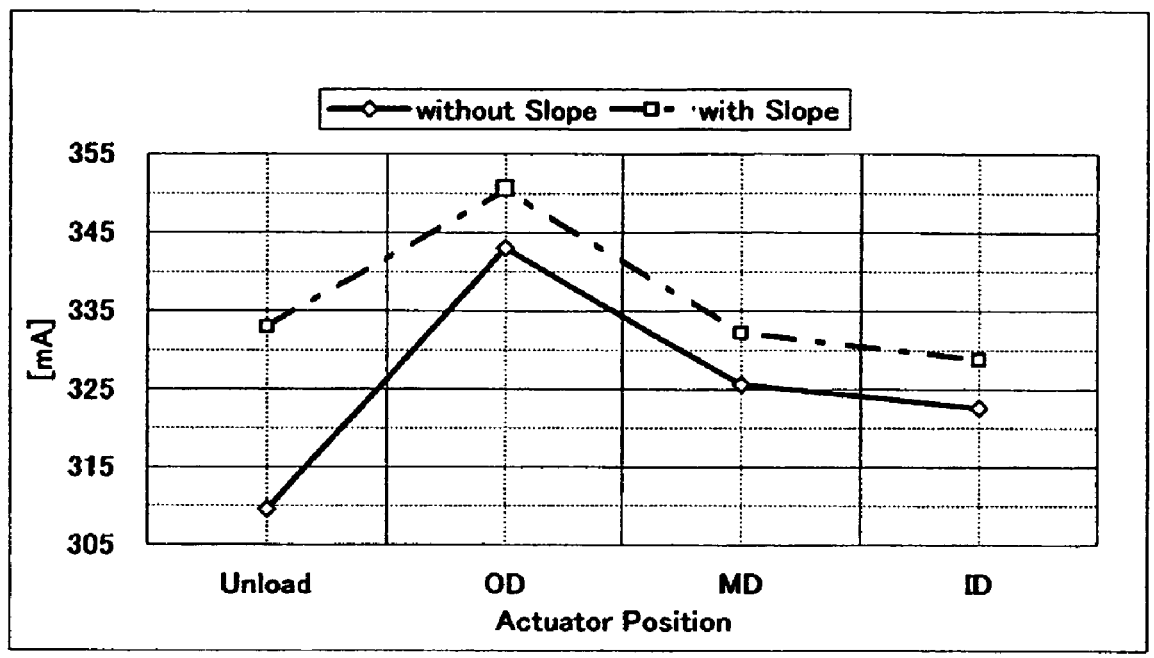
FIG. 8 is a graph, to exhibit the effects of the second step of the present embodiment, showing the actual measurement values of current amounts of spindle motors of a HDD provided with a vertical second step and a HDD provided with a second step formed with a slope.

FIG. 8 is a diagram showing the effect of the second step 216 in the present embodiment. The current amounts of the spindle motor were measured for a HDD having the base in which the second step 216 is not inclined is mounted thereon, and a HDD having the base in which the slope and fins similar to those of the first step 215 are provided on the second step 216 mounted thereon. The first step 215 was provided with the slope 251 and the plurality of fins 252, as shown in FIG. 2. The structures of the two HDDs were the same except the shape of the second step. FIG. 8 shows the measurements. In the graph of FIG. 8, the X-axis indicates a position of an actuator, and the Y-axis indicates the current amount of a spindle motor. In the HDD having the second step 216 without a slope, a reduction in the current amount of the spindle motor in the positions of the actuator is found as shown in the graph of FIG. 8.

As described above, an inclined angle of the second step 216 that generates an airflow running from the second bottom surface 212 toward the first bottom surface 211 is made larger than that of the first step 215 that generates an airflow running from the first bottom surface 211 close to the magnetic disk 101 toward the second bottom surface 212 away from the magnetic disk 101. This achieves suppression of turbulence generation and reduction in consumption power. It is to be noted that in the above-described embodiment, the first step 215 is provided with the fins 252, but the first step 215 may not be provided with fins in other embodiments.

The foregoing description explains the embodiments of the present invention, and the present invention is not limited thereto. It is possible for those skilled in art to easily change, add or convert the elements of the aforementioned embodiments within the scope of the present invention. For example, the present invention can be applied to a device provided with a recording disk other than the magnetic disk of the present invention. Alternatively, the present invention can be applied to a data storage device for carrying out only reproduction in addition to a data storage device for carrying out recording and reproduction.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
    a motor for rotating a recording disk;
    a base configured to house said motor therein, and having a first bottom surface opposite to said recording disk and a second bottom surface opposite to said recording disk, a distance between the second bottom surface and said recording disk being greater than a distance between the first bottom surface and the said recording disk; and
    an upright fin extending from the first bottom surface to the second bottom surface, formed on a slope between the first bottom surface and the second bottom surface, where rotation of the recording disk produces an airflow running from the first bottom surface toward the second bottom surface;
    wherein said slope extends from said first bottom surface toward said second bottom surface;
    wherein the slope is formed with a plurality of fins;
    wherein each of said plurality of fins has a circular arc sidewall which is convex toward an outer circumference of said recording disk.

2. The disk drive according to claim 1, wherein said plurality of fins are spaced apart from each other at substantially equal intervals in a radial direction of said recording disk.

3. The disk drive according to claim 1, wherein an inclined angle of said slope is substantially 5° to 15°.

4. The disk drive according to claim 1, wherein said slope is a multi-step slope.

5. The disk drive according to claim 1, wherein said fin is formed integrally with said base.

6. The disk drive according to claim 1, further comprising an actuator that is turned to thereby move a head on said recording disk;
    wherein said second bottom surface is formed at a level lower than said first bottom surface so as to define a turning range of said actuator.

7. A disk drive comprising:
    a motor for rotating a recording disk;
    a base for housing said motor, and having a first bottom surface opposite to said recording disk and a second bottom surface, a distance between the second bottom surface and said recording disk being greater than a distance between said first bottom surface and the recording disk;
    a first transition surface located between said first bottom surface and said second bottom surface, where rotation of the recording disk produces an airflow running from said first bottom surface toward said second bottom surface; and
    a second transition surface located between said first bottom surface and said second bottom surface, where the rotation of the recording disk produces an airflow running from said second bottom surface toward said first bottom surface, the second transition surface having an inclined angle larger than an inclined angle of said first transition surface;
    wherein said first transition surface is provided with an upright fin extending from said first surface toward said second surface.

8. The disk drive according to claim 7, wherein the inclined angle of said first transition surface is substantially 5° to 15°.

9. The disk drive according to claim 8, wherein the inclined angle of said second transition surface is substantially 45° or more.

10. The disk drive according to claim 7, wherein a slope of said second transition surface is substantially vertical with respect to said first bottom surface.

11. The disk drive according to claim 7, wherein said fin is formed integrally with said base.

12. The disk drive according to claim 11, wherein said plurality of fins are spaced apart from each other at substantially equal intervals in a radial direction of said recording disk.

13. The disk drive according to claim 7, wherein said first transition surface is provided with a plurality of upright fins extending from said first surface toward said second surface.

14. The disk drive according to claim 13, wherein said plurality of fins each have an inner circumferential surface and an outer circumferential surface that are curved in the inner circumferential direction of said recording disk.

15. The disk drive according to claim 7, wherein said first transition surface is formed with a slope extending from said first bottom surface toward said second bottom surface, and wherein said slope is a multi-step slope.

16. The disk drive according to claim 7, further comprising an actuator that is turned to thereby move a head on said recording disk;
    wherein said second bottom surface is formed at a level lower than said first bottom surface so as to define a turning range of said actuator.

* * * * *

UNITED STATES PATENT AND TRADEMARK OFFICE
CERTIFICATE OF CORRECTION

| | | |
|---|---|---|
| PATENT NO. | : 7,535,671 B2 | Page 1 of 1 |
| APPLICATION NO. | : 11/317950 | |
| DATED | : May 19, 2009 | |
| INVENTOR(S) | : Takao Suzuki et al. | |

It is certified that error appears in the above-identified patent and that said Letters Patent is hereby corrected as shown below:

On the Title Pg. and Col. 1 lines 1-3

In the Title:

Item (54), please delete "Disk drive with airflow control and fins at a transition surface between base surfaces" and insert -- Disk drive with airflow control and fins at a transitional surface between base surfaces --

Signed and Sealed this

Fourteenth Day of July, 2009

JOHN DOLL
*Acting Director of the United States Patent and Trademark Office*